(12) United States Patent
Majumdar et al.

(10) Patent No.: US 7,037,204 B2
(45) Date of Patent: May 2, 2006

(54) STANDARD THREADED TORQUE FASTENER WITH NOVEL INDENTATION PATTERNS TO ENHANCE TORQUE AND SELF-LOCKING CAPABILITIES

(75) Inventors: Barun Majumdar, 1039 Bungalow Pl., Arcadia, CA (US) 91006; Arunabh Bhattacharya, Simi Valley, CA (US)

(73) Assignee: Barun Majumdar, Redmond, WA (US)

( * ) Notice: Subject to any disclaimer, the term of this patent is extended or adjusted under 35 U.S.C. 154(b) by 0 days.

(21) Appl. No.: 10/330,979

(22) Filed: Dec. 30, 2002

(65) Prior Publication Data

US 2004/0127297 A1 Jul. 1, 2004

(51) Int. Cl.
*B21H 3/02* (2006.01)
(52) U.S. Cl. .............................................. 470/8; 470/9
(58) Field of Classification Search .................... 470/8, 470/9, 10; 411/308, 309, 310, 311, 418, 411/420, 421
See application file for complete search history.

(56) References Cited

U.S. PATENT DOCUMENTS

| | | | | | |
|---|---|---|---|---|---|
| 2,827,313 | A | * | 3/1958 | Conner | 285/355 |
| 3,220,029 | A | * | 11/1965 | Neuschotz | 470/8 |
| 3,459,250 | A | * | 8/1969 | Tabor | 411/310 |
| 3,479,675 | A | * | 11/1969 | Ricca | 470/10 |
| 3,850,215 | A | * | 11/1974 | Orlomoski | 411/311 |
| 4,842,467 | A | * | 6/1989 | Armstrong | 411/399 |
| 5,110,245 | A | * | 5/1992 | Hiroyuki | 411/421 |
| 5,117,667 | A | * | 6/1992 | Hatter | 72/88 |
| 5,267,423 | A | * | 12/1993 | Giannuzzi | 52/410 |
| 6,033,313 | A | * | 3/2000 | Nojikawa | 470/10 |
| 6,152,666 | A | * | 11/2000 | Walther et al. | 411/311 |

\* cited by examiner

Primary Examiner—Ed Tolan

(57) ABSTRACT

The novel concept to be patented involves minutely indenting the standard fasteners along the pitch line at various points and utilizing the small material deformations around these indentations to provide substantial engagement to resist loosening of the joint under operational loads. The basic idea is to stamp a typical pattern (two are described below) on the fastener to achieve the advantages of a self-locking mechanism as well as enhance the torque and load carrying capability of the joint. Moreover, the indentations being in the order of few mils would not degrade the strength of the fastener, but would continue to provide sufficient load transfer across the joint without loss of preload. Furthermore, the joint can be disassembled and the fasteners can then be reused for the subsequent operations. These unique indentations on the fasteners can be of varying numbers, depths, geometry (spherical, elliptical etc.) and of various patterns (linear, staggered etc.) as dictated by the requirements of an application. The fastener can then withstand a considerable high temperature stress depending on its material composition/alloy. Lastly, the fastener can also withstand moderate to intense vibration depending on the added torque value by decreasing or increasing the number of indentations. In summary, the uniqueness of our concept lies in utilizing these indentation patterns in a simpler inexpensive way to achieve self-locking capability and meet the life cycle requirements of the joint for any given engineering application.

2 Claims, 2 Drawing Sheets

Linear Pattern of Indentations Stamped:

Indentation Pattern
Figure 1: Virgin Bolt
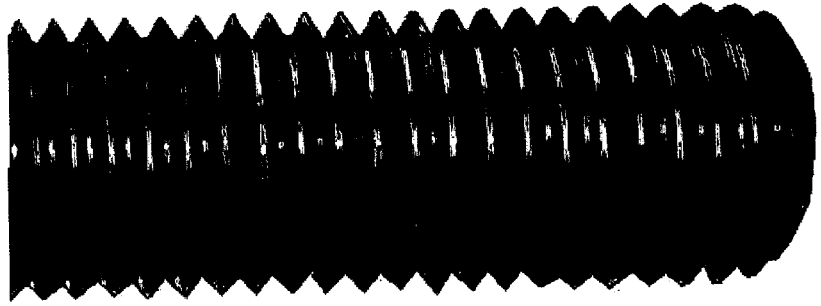
Figure 2: Linear Pattern of Indentations Stamped:
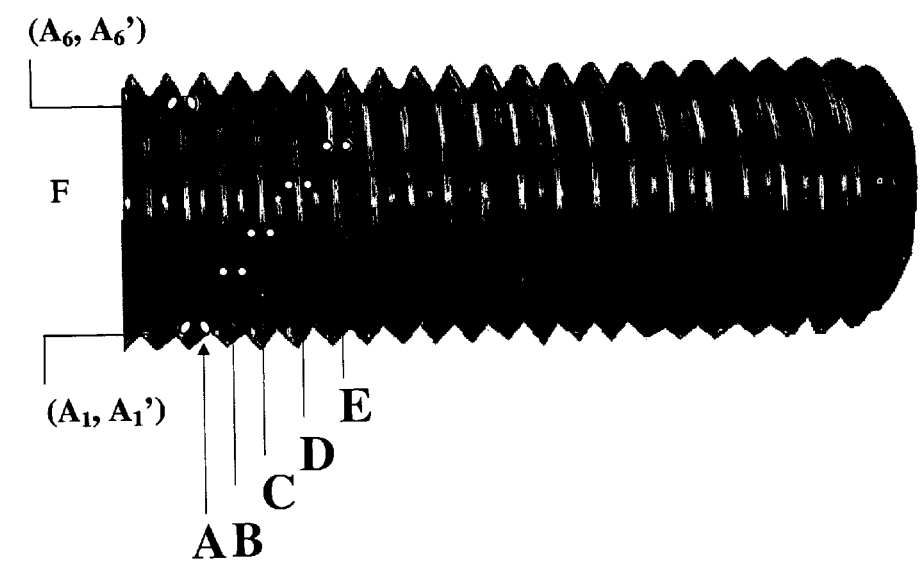

Figure 3: Staggered Pattern of Indentation Stamped
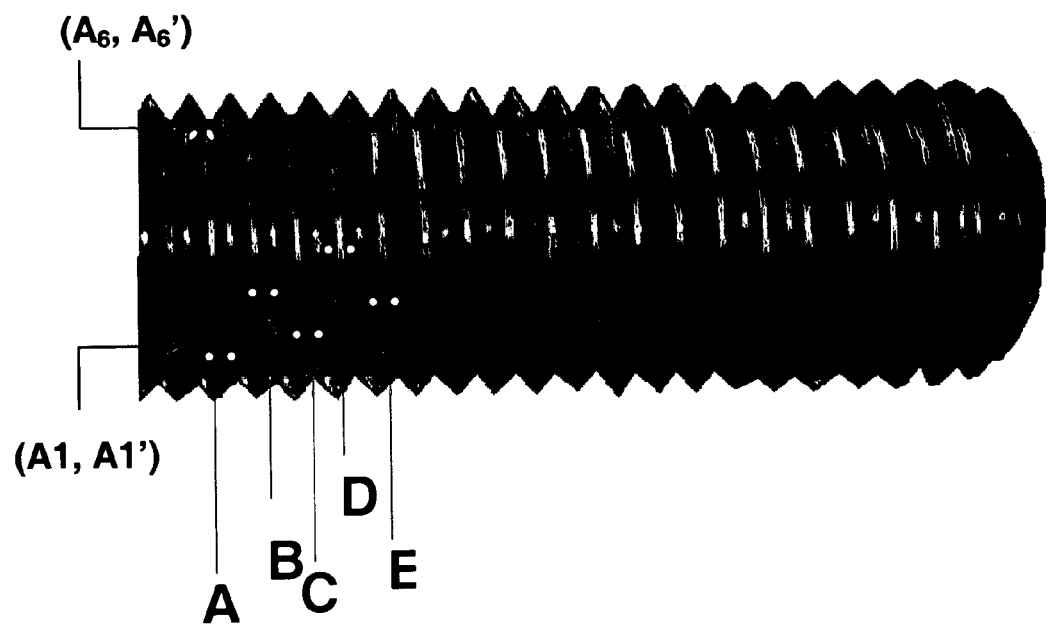

STANDARD THREADED TORQUE FASTENER WITH NOVEL INDENTATION PATTERNS TO ENHANCE TORQUE AND SELF-LOCKING CAPABILITIES

CROSS REFERENCE TO RELATED APPLICATION

While searching for related work, we looked at 1) structure, 2) function and 3) the overall appearance of other inventions compared to the novelty of our present invention. Structural considerations involved how it really works and how it is put together and what different parts are used in the construction. Functional considerations involved looking at what one specific invention does and to what extension it accomplishes the objective. Finally, overall appearances involved whether prior patents looked substantially different. The conclusion is that there has been no such invention to our knowledge that directly resembles our concept in structure and extent of the function or design/appearance. The ones that are relevant to a little extent in this area are described below.

Prior work done by Nason et al. [1], Criswell [2] and Orlomoski [3] is related to the present invention and is only relevant to the extent that a similar function is disclosed. Their invention provides the function of self-locking but there are inherent structural differences in their design and invention with ours, and is very different from the one, proposed here in function and appearance.

Another company called Long-Lok [4] uses nylon type patching of various shapes on a wide range of their metal fasteners to achieve self-locking. This is in contrast to ours where we make use of the unique indentation patterns. Another type of Long-Lok fasteners called Dyna-Thread II, makes obvious reference to their patented design (with no patent number provided in the reference handbook) and has been using bolts with the periphery of its controlled thread area dilated to produce the desired torque. Additionally, the configuration of this fastener with an axial hole for dilation renders it absolutely unsuitable for high strength application. Furthermore, such dilated bolts experience lower strength capabilities (due to a very thin wall) on the dilated surface and under mechanical loading, could lead to a shear failure due to a reduced load transfer or fail in fatigue under vibratory loads. Finally, these Dyna-Thread II fasteners are very expensive as well.

The remaining patents to Matsunami [5], Iwata [6] are provided as a general interest and are also pertinent to the construction and design of the invention. They do not render obvious self-locking fasteners of the present invention.

STATEMENT REGARDING FEDERALLY SPONSORED RESEARCH OR DEVELOPMENT

Federally sponsored R&D work has not been done on the above subject to this date.

REFERENCE TO SEQUENCE LISTING, A TABLE OR A COMPUTER PROGRAM

None.

BACKGROUND OF THE INVENTION

Working in the American automotive and aerospace industries for decades, the authors identified a problem with the fastener-joints to be solved, and this prompted them into this innovation process.

The fasteners most commonly used in various industries (automotive, aerospace etc.) do not provide adequate torque and self-locking features to resist loss of preload or axial tension under dynamic/vibratory loading.

Few predecessors tried to incorporate various features to add self-locking capabilities to the joints. In particular, Nylok and Longlok fasteners that are already in use provide torque that is suitable up to moderate temperature (250° F.) applications. Another group of fasteners called Dyna-thread II was designed such that the periphery of its controlled thread area is dilated to produce the desired torque. Even though it can be used as a high temperature application, there is a limitation on the size of the bolt itself (1" O.D./nominal size max.). Additionally, on such fasteners, it becomes difficult to control the expansion of threaded area as the nominal diameter of the bolt increases. Furthermore, as such engineering applications may need higher torque, one may need to increase the dilation of the thread but that in turn gets cumbersome as the bolt diameter increase (1" O.D./nominal size max.).

In addition to the above concerns, dilated fasteners experience lower strength capabilities (due to a very thin wall) on the dilated surface compared to the rated strength capabilities at the full cross section of the fastener. Lastly, under mechanical loading, such dilations could lead to a shear failure due to a reduced load transfer or result in a fatigue failure of the fastener due to repeated loading and unloading.

BRIEF SUMMARY OF THE INVENTION

The concept presented above enhances the torque carrying and self-locking capabilities of mechanical joints without appreciably degrading the fatigue life of the indented bolt and maintaining safety factor of the mechanical joint in operation.

In our proposed concept, the threaded fastener is indented along its pitch line at various points and the material deformation around these indentations are utilized to provide substantial engagement which helps the joints in withstanding moderate to intense vibrations. The concept incorporates the following ideas:

a) Varying the number of indentations
b) Controlling the depth of indentations
c) Geometry of the indentations depending on the tool designed for this purpose and
d) Varying the pattern of indentations to suit the application These indentations unlike the concepts discussed previously, are minute and hence would cause a minimal loss of strength and can be mapped to vary the range of torque required for the intended applications.

Such self-locking fasteners when properly designed, engineered and installed will virtually eliminate loss of preload and joint separation under dynamic/vibratory loads which otherwise have caused a loosening of the mechanical joints.

BRIEF DESCRIPTION OF THE DRAWING

FIG. 1 delineates a virgin fastener without thread indentations.

In FIG. 2, spherical indentations have been marked on five consecutive threads.

In FIG. 3, spherical indentations have been marked in a staggered manner. Each of these figures represents a family of indentation patterns. End F represents the left-hand side of each of these fasteners.

FIG. 1 shows the threaded portion of a common fastener. In FIG. 2, spherical indentations have been marked in five consecutive threads to constitute a linear pattern. In FIG. 3, spherical indentations have been marked in a staggered manner. Each of these FIGS. 2 and 3 represents a family of indentation patterns and are described below.

Linear Pattern:

In FIG. 2, six indentation marks have been made peripherally along the pitch circle diameter of the fastener for a single pitch of the thread. First pair of indentations ($A_1$, $A_1'$) starts at a distance of 1½ thread from the face F of the fastener. Similarly, other five indentations [($A_2$, $A_2'$), ($A_3$, $A_3'$), ($A_4$, $A_4'$), ($A_5$, $A_5'$), ($A_6$, $A_6'$)] are also performed peripherally at an included angle of 60° for consecutive pair of indentations. Thus six pair of indentation marks are stamped beginning from ($A_1$, $A_1'$).

The next set of indentation (B1, B1') begins from the adjacent thread at an angle of 60° from ($A_1$, $A_1'$) with respect to the axes of the fastener. Then, other 5 indentations [($B_2$, $B_2'$), ($B_3$, $B_3'$), ($B_4$, $B_4'$), ($B_5$, $B_5'$), ($B_6$, $B_6'$)] are performed peripherally at an included angle of 60° for consecutive pair of indentations. Thus six pair of equidistant indentation marks are formed beginning consecutively from ($B_1$, $B_1'$). Similarly, six pair of equidistant indentation marks are formed beginning consecutively from ($C_1$, $C_1'$), ($D_1$, $D_1'$), ($E_1$, $E_1'$) at an angle of 60° with respect to the axes of the fastener. Hence, there is an array of indentations beginning from ($A_1$, $A_1'$), ($B_1$, $B_1'$), ($C_1$, $C_1'$), ($D_1$, $D_1'$), ($E_1$, $E_1'$) which forms a linear indentation pattern.

Please note that in FIG. 2, among the six pair of indentations on a first full/360' thread, only two: ($A_1$, $A_1'$) and ($A_6$, $A_6'$) are shown. The other intermediate indentations at 60° intervals, namely ($A_2$, $A_2'$) through ($A_5$, $A_5'$) are not shown for simplicity in illustration. Similarly, ($B_2$, $B_2'$) through ($B_6$, $B_6'$), ($C_2$, $C_2'$) through ($C_6$, $C_6'$), ($D_2$, $D_2'$) through ($D_6$, $D_6'$) and ($E_2$, $E_2'$) through ($E_6$, $E_6'$) are not shown as well to keep clarity in the diagram.

Staggered Pattern:

In FIG. 3, six indentation marks have been made peripherally along the pitch circle diameter of the fastener for a single pitch of the thread. First pair of indentations ($A_1$, $A_1'$) starts at a distance of 1½ thread from the face F of the fastener. Similarly, other five indentations [($A_2$, $A_2'$), ($A_3$, $A_3'$), ($A_4$, $A_4'$), ($A_5$, $A_5'$), ($A_6$, $A_6'$)] are also performed peripherally at an included angle of 60° for consecutive pair of indentations. Thus six pair of indentation marks are stamped beginning from ($A_1$, $A_1'$).

The next set of indentation ($C_1$, $C_1'$) begins by skipping the adjacent thread and making an angle of 15° from ($A_1$, $A_1'$), with respect to the axis of the fastener. The other five indentations [($C_2$, $C_2'$), ($C_3$, $C_3'$), ($C_4$, $C_4'$), ($C_5$, $C_5'$), ($C_6$, $C_6'$)] are performed peripherally at an included angle of 60° for consecutive pair of indentations. Thus six pair of indentations marks are formed beginning from ($C_1$, $C_1'$) and culminating at ($C_6$, $C_6'$). Similarly, skipping the following thread, six pair of indentation marks are formed making an angle of 15° from ($C_1$, $C_1'$) with respect to the axes of the fastener beginning from ($E_1$, $E_1'$) and culminating at ($E_6$, $E_6'$). Now, a staggered set of indentations are formed beginning from (B1, B1') such that the marks ($B_1$, $B_1'$) and ($C_1$, $C_1'$) are equidistant from this starter ($A_1$, $A_1'$). Thus six pair of equidistant marks are formed beginning from ($B_1$, $B_1'$) and culminating at ($B_6$, $B_6'$). Finally, skipping the adjacent thread and making an angle of 15° from ($B_1$, $B_1'$) with respect to the axes of the fastener, six pair of indentation marks are formed beginning from ($D_1$, $D_1'$) and ending at ($D_6$, $D_6'$). Hence, there are two arrays of indentations beginning from ($A_1$, $A_1'$), ($C_1$, $C_1'$), ($E_1$, $E_1'$) which forms a linear indentation pattern and the other begins from ($B_1$, $B_1'$), ($D_1$, $D_1'$) which forms a linear indentation pattern as well in a staggered fashion.

Please note that in FIG. 3, among the six pairs of indentations on the first 360° thread, only two: ($A_1$, $A_1'$) and ($A_6$, $A_6'$) are shown. The other intermediate indentations at 60° intervals, namely ($A_2$, $A_2'$) through ($A_5$, $A_5'$) are not shown for simplicity in illustration. Similarly, ($B_2$, $B_2'$) through ($B_6$, $B_6'$), ($C_2$, $C_2'$) through ($C_6$, $C_6'$), ($D_2$, $D_2'$) through ($D_6$, $D_6'$) and ($E_2$, $E_2'$) through ($E_6$, $E_6'$) are not shown as well to keep clarity in the diagram.

Our Intent:

The intent of the above illustrations is to demonstrate that such unique indentations can be made on a fastener in a particular pattern, which can be stamped on the fastener depending on the load and torque requirements of the application. It should be obvious that there are numerous other patterns possible, but the objective is to patent the general concept of stamping a fastener with a series of indentations along the pitch line to suit the torque and preload needs of the joint and resist loosening of the same. Furthermore, such patterns being small would not appreciably degrade the strength and fatigue life of the joint.

The invention claimed is:

1. A method of stamping spherical indentations into a pitch line of a standard threaded fastener comprising the steps of;

providing a standard threaded fastener, stamping a first pair of indentations at a desired thread distance from a face of the fastener, stamping other pairs of indentations peripherally at an included angle of 60 degrees along a pitch circle diameter of the fastener for a single pitch of the thread to form a first set of indentations.

stamping a second set of indentations into an adjacent thread starting at an angle of 60 degrees from the first pair of indentations with respect to an axis of the fastener to form a second set of indentations, stamping additional sets of indentations into adjacent threads to form a linear indentation pattern.

2. A method of stamping spherical indentations into a pitch line of a standard threaded fastener comprising the steps of;

providing a standard threaded fastener, stamping a first pair of indentations at a desired thread distance from a face of the fastener, stamping other pairs of indentations peripherally at an included angle of 60 degrees along a pitch circle diameter or the fastener for a single pitch of the thread to form a first set of indentations, stamping a second set of indentations into an alternate thread by skipping the adjacent thread, starting at an angle of 15 degrees from the first pair of indentations with respect to an axis of the fastener to form a second set of indentations, stamping additional sets of indentations into alternate threads to form a staggered indentation pattern.

* * * * *